(12) United States Patent
Saitoh et al.

(10) Patent No.: US 12,291,648 B2
(45) Date of Patent: May 6, 2025

(54) ENERGY RAY-CURABLE RESIN COMPOSITIONS AND ITS CURED PRODUCTS

(71) Applicant: CANON KABUSHIKI KAISHA, Tokyo (JP)

(72) Inventors: Terunobu Saitoh, Tokyo (JP); Kenichi Kanai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 17/469,182

(22) Filed: Sep. 8, 2021

(65) Prior Publication Data

US 2022/0081571 A1    Mar. 17, 2022

(30) Foreign Application Priority Data

Sep. 11, 2020  (JP) ................. 2020-152638
Sep. 11, 2020  (JP) ................. 2020-153327
Aug. 26, 2021  (JP) ................. 2021-138345

(51) Int. Cl.
| | | |
|---|---|---|
| *B29C 64/124* | (2017.01) | |
| *B29C 64/35* | (2017.01) | |
| *B33Y 10/00* | (2015.01) | |
| *B33Y 40/20* | (2020.01) | |

(Continued)

(52) U.S. Cl.
CPC .............. *C09D 4/00* (2013.01); *B29C 64/124* (2017.08); *B29C 64/35* (2017.08); *B33Y 10/00* (2014.12); *B33Y 40/20* (2020.01); *B33Y 70/00* (2014.12); *C08F 220/1805* (2020.02); *C08F 220/1806* (2020.02); *C08F 220/1811* (2020.02);

(Continued)

(58) Field of Classification Search
CPC ....... B29C 64/124; B29C 64/35; B33Y 10/00; B33Y 40/20; B33Y 70/00; B33Y 80/00; C09D 4/00; C09D 133/14; C09D 133/062; C09D 11/101; C08F 220/1805; C08F 220/1806; C08F 220/282; C08F 220/1809; C08F 2/48; C08F 220/28; C08F 220/301; C08F 220/1811; C08F 222/102;

(Continued)

(56) References Cited

U.S. PATENT DOCUMENTS

2012/0295077 A1* 11/2012 Ficek ................. G03F 7/105
                                                              264/401
2019/0211219 A1*  7/2019 Kondo .................. C09D 11/52
(Continued)

FOREIGN PATENT DOCUMENTS

JP    2011225824 A    11/2011
WO   2009145167 A1   12/2009
(Continued)

*Primary Examiner* — Galen H Hauth
*Assistant Examiner* — Baileigh Kate Darnell
(74) *Attorney, Agent, or Firm* — Canon U.S.A., Inc. I.P. Division (57) ABSTRACT

A photocurable material formulation for a lost model that has a high elastic modulus, shows small thermal expansion, has heat resistance in a certain temperature region, and is free of a photoacid generator to be used in an epoxy material or the like. The formulation is a photocurable composition including curable materials formed of monofunctional (meth)acrylates each having a molecular weight of 150 or more and less than 350, and a bifunctional (meth)acrylate having a molecular weight of 200 or more and less than 400.

14 Claims, 1 Drawing Sheet

(51) Int. Cl.
  *B33Y 70/00*    (2020.01)
  *C08F 220/18*   (2006.01)
  *C08F 220/28*   (2006.01)
  *C09D 4/00*     (2006.01)
  *C09D 133/06*   (2006.01)
  *C09D 133/14*   (2006.01)
  *B29K 105/00*   (2006.01)

(52) U.S. Cl.
  CPC ...... *C08F 220/282* (2020.02); *C09D 133/062* (2013.01); *C09D 133/14* (2013.01); *B29K 2105/0085* (2013.01)

(58) Field of Classification Search
  CPC ......... C08F 220/1818; C08F 222/1063; B29K 2105/0085
  See application file for complete search history.

(56) References Cited

U.S. PATENT DOCUMENTS

| | | | | |
|---|---|---|---|---|
| 2019/0241691 A1* | 8/2019 | Kito | .................... | C08F 220/282 |
| 2019/0241694 A1* | 8/2019 | Shibata | .................... | C08F 2/44 |
| 2020/0056061 A1* | 2/2020 | Sato | ...................... | C08K 5/005 |
| 2022/0073753 A1* | 3/2022 | Domoto | .................. | C08F 2/50 |
| 2023/0193090 A1* | 6/2023 | Uchida | ................. | C09J 133/08 |
| | | | | 156/334 |

FOREIGN PATENT DOCUMENTS

| | | | |
|---|---|---|---|
| WO | 2017222025 | A1 | 12/2017 |
| WO | 2018181833 | A1 | 10/2018 |

* cited by examiner

ENERGY RAY-CURABLE RESIN COMPOSITIONS AND ITS CURED PRODUCTS

BACKGROUND OF THE INVENTION

Field of the Invention

The present disclosure relates to a photocurable composition and a method of manufacturing a cured product for a lost model to be used in a lost-wax casting method through use of the composition.

Description of the Related Art

In recent years, an additive shaping technology including shaping a three-dimensional object from a photocurable material based on three-dimensional data has started to be widely adopted because a target three-dimensional shaped object can be manufactured with satisfactory dimensional accuracy without a need of producing a mold or the like.

In a method (optical three-dimensional shaping method) of shaping the three-dimensional object from the photocurable material through use of the additive shaping technology, the shaping is generally performed by the following procedure. UV laser light controlled by a computer so that a desired pattern may be obtained is selectively applied to the liquid surface of the photocurable material loaded into a container to cure a predetermined thickness of the material, thereby forming a cured layer. Next, the liquid photocurable material is supplied onto the cured layer, and the UV laser light is similarly applied to cure a predetermined thickness of the curable material, thereby forming another cured layer. Then, those steps are repeated to manufacture a three-dimensional shaped object.

The viscosity of a material to be used in the optical three-dimensional shaping is desirably as low as possible in order to improve the property by which bubbles included in the liquid photocurable material supplied onto the cured layer are removed and the smoothness of the liquid surface of the material. In addition, not only various models, such as a design prototype, an architectural model, and a medical model, but also, for example, a lost model for obtaining a casting has been manufactured by using the optical three-dimensional shaping method. The development of an energy ray-curable resin composition including not only improvements in kind and preparation method of a resin material but also the addition of a functional filler, a dye, or the like has been advanced in accordance with characteristics required in each of those applications.

In International Publication No. WO2017/222025, there are disclosures of a resin composition for a model material for obtaining an optically shaped article that has flexibility and does not break even when bent, and a method of manufacturing an optically shaped article shaped by using the resin composition for a model material. In the resin composition for a model material of International Publication No. WO2017/222025, the following formulation is selected. 20 Parts by weight to 90 parts by weight of a monofunctional monomer containing a cyclic ether skeleton, and 5 parts by weight or more of a polyfunctional oligomer are incorporated into 100 parts by weight of a curable resin composition, and a polyfunctional monomer is not incorporated thereinto or 15 parts by weight or less thereof is incorporated thereinto.

In International Publication No. WO2018/181833, there is provided a photocurable composition that is excellent in bending strength and bending modulus, has bending resistance, and is also excellent in tensile strength and elongation ratio. Specifically, a di(meth)acrylic monomer, which is at least one kind selected from di(meth)acrylic monomers each free of a hydroxy group and a carboxyl group in a molecule thereof, and each having two aromatic rings and two (meth)acryloyloxy groups therein, and has a weight-average molecular weight of 400 or more and 800 or less, and a (meth)acrylic monomer, which is at least one kind selected from (meth)acrylic monomers each having at least one ring structure and one (meth)acryloyloxy group in a molecule thereof, and has a weight-average molecular weight of 130 or more and 350 or less, are selected as polymerizable compounds for the photocurable composition.

An object of International Publication No. WO2017/222025 is to obtain a shaped object having flexibility. However, when a shaped object having a large size is manufactured or depending on the shape of the shaped object, concern is raised in that the shaped object cannot withstand its own weight, and is hence distorted. Further, in International Publication No. WO2018/181833, the photocurable composition that is excellent in bending strength and bending modulus, and is also excellent in bending resistance, tensile strength, and elongation ratio is provided by using the monomers whose molecular weights are specified. However, a cured product of the composition has a high Tg, and hence when the cured product is used as a lost model, concern is raised about the deterioration of the property by which the model is lost.

SUMMARY OF THE INVENTION

The present disclosure has been made in view of the above-mentioned background art. An aspect of the present disclosure is to provide a photocurable composition that provides a shaped object showing small thermal expansion, and having a high elastic modulus and heat resistance in a certain temperature region, the photocurable composition being free of a photoacid generator.

According to one embodiment of the present disclosure, there is provided a photocurable composition including curable materials formed of monofunctional (meth)acrylates each having a molecular weight of 150 or more and less than 350, and a bifunctional (meth)acrylate having a molecular weight of 200 or more and less than 400, wherein a content of the monofunctional (meth)acrylates is 80 mol % or more and 90 mol % or less of the curable materials, and the monofunctional (meth)acrylates are formed of a monofunctional (meth)acrylate having an alicyclic skeleton for forming a three-dimensional crosslinked structure and a monofunctional (meth)acrylate containing an alicyclic structure having an ether bond, or wherein the content of the monofunctional (meth)acrylates is 60 mol % or more and 75 mol % or less of the curable materials, and the monofunctional (meth)acrylates are formed of a monofunctional (meth)acrylate having an alicyclic skeleton and having quaternary carbon, and a monofunctional (meth)acrylate having a branched alkyl chain structure having 15 to 20 carbon atoms.

According to another embodiment of the present disclosure, there is provided a cured product including a polymer of the photocurable composition.

According to still another embodiment of the present disclosure, there is provided a method of manufacturing a cured product including polymerizing the photocurable composition.

The photocurable composition of the present disclosure is suitable as a base material for providing a lost model in which a cured product is manufactured by an optical three-dimensional shaping method. In addition, the method of manufacturing a cured product of the present disclosure is characterized in that the cured product is obtained by adding a photopolymerization initiator and a light absorber required for the shaping of the cured product to the above-mentioned photocurable composition, and polymerizing the mixture.

The cured product of the photocurable composition of the present disclosure is characterized by serving as a pattern for a lost model.

Further features of the present disclosure will become apparent from the following description of exemplary embodiments with reference to the attached drawing.

DESCRIPTION OF THE EMBODIMENTS

First Embodiment

A first embodiment of the present disclosure is described in detail below. First, a photocurable composition according to the first embodiment of the present disclosure is described. The photocurable composition of the first embodiment of the present disclosure is a photocurable composition including curable materials formed of monofunctional (meth)acrylates each having a molecular weight of 150 or more and less than 350, and a bifunctional (meth)acrylate having a molecular weight of 200 or more and less than 400, the composition being characterized in that the content of the monofunctional (meth)acrylates is 80 mol % or more and 90 mol % or less of the curable materials, and the monofunctional (meth)acrylates are formed of a monofunctional (meth)acrylate having an alicyclic skeleton for forming a three-dimensional crosslinked structure and a monofunctional (meth)acrylate containing an alicyclic structure having an ether bond.

The curable materials are not particularly limited as long as the curable materials are formed of the monofunctional (meth)acrylates each having a molecular weight of 150 or more and less than 350, and the bifunctional (meth)acrylate having a molecular weight of 200 or more and less than 400. The molecular weight of each of the monofunctional (meth)acrylates is 150 or more, and the molecular weight of the bifunctional (meth)acrylate is 200 or more because as the molecular weights become smaller, the volatility of the material becomes higher to lead to a change in formulation thereof at the time of its storage. In addition, as the molecular weights become larger, the ratio of a soft moiety, such as an ethylene glycol chain or a propylene glycol chain, increases, and hence the ratio of a main skeleton moiety required for the expression of mechanical properties, such as an alicyclic skeleton, reduces. Thus, the mechanical characteristics of the material as a material for a lost model reduce. Accordingly, the molecular weight of each of the monofunctional (meth)acrylates is less than 350, and the molecular weight of the bifunctional (meth)acrylate is less than 400.

In the photocurable composition of this embodiment, the content of the curable materials is 60 wt % or more and 99.5 wt % or less in consideration of, for example, the curability of the material and the mechanical characteristics of a cured product thereof. The content is preferably 80 wt % or more and 99.5 wt % or less in consideration of, for example, reductions in mechanical characteristics.

In the photocurable composition of this embodiment, the content of the monofunctional (meth)acrylates in the curable materials is 80 mol % or more and 90 mol % or less in order to provide a cured product serving as a lost model having a high elastic modulus, showing small thermal expansion, and having heat resistance in a certain temperature region.

The monofunctional (meth)acrylate having the alicyclic skeleton for forming the three-dimensional crosslinked structure is not particularly limited as long as the cured product of the photocurable composition serves as a lost model showing small thermal expansion, and having a high elastic modulus and heat resistance in a certain temperature region. Examples of the monofunctional (meth)acrylate having the alicyclic skeleton include monofunctional (meth)acrylates each containing an adamantane skeleton, a norbornane skeleton, or a dicyclopentadiene skeleton. Specific examples thereof include alicyclic (meth)acrylates each forming a three-dimensional crosslinked structure, such as isobornyl (meth)acrylate, dicyclopentanyl (meth)acrylate, dicyclopentenyl (meth)acrylate, dicyclopentenyloxyethyl (meth)acrylate, 2-methyl-2-adamantyl (meth)acrylate, 2-ethyl-2-adamantyl (meth)acrylate, 3-hydroxy-1-adamantyl (meth)acrylate, and 1-adamantyl (meth)acrylate. In addition, one kind of the monofunctional (meth)acrylates each having the alicyclic skeleton may be incorporated into the photocurable composition, or a plurality of kinds thereof may be simultaneously incorporated thereinto.

The alicyclic skeleton of this embodiment is a molecular structure formed of a carbon atom and a hydrogen atom unless otherwise stated, and is free of a heteroatom, such as an oxygen atom or a nitrogen atom.

The monofunctional (meth)acrylate containing the alicyclic structure having the ether bond is not particularly limited as long as the cured product of the photocurable composition serves as a lost model showing small thermal expansion, and having a high elastic modulus and heat resistance in a certain temperature region. Examples of the monofunctional (meth)acrylate containing the alicyclic structure having the ether bond include monofunctional (meth)acrylates each containing a dioxane skeleton, a tetrahydropyrane skeleton, or a tetrahydrofuran skeleton. When the photocurable composition of this embodiment includes the monofunctional (meth)acrylate containing the alicyclic structure having the ether bond, the high elastic modulus, small thermal expansion, and heat resistance in a certain temperature region of the cured product are secured by a structure derived from the monofunctional (meth)acrylate containing the alicyclic structure. In addition, interlayer adhesiveness at the time of the shaping of the cured product by an optical three-dimensional shaping method can be improved by the structure derived from the monofunctional (meth)acrylate containing the alicyclic structure having the ether bond. Thus, not only the bending modulus of the cured product but also the bending strength thereof can be improved. Specific examples of the monofunctional (meth)acrylate include monofunctional (meth)acrylates each containing an alicyclic structure having an ether bond, such as tetrahydro-2H-pyran-2-yl acrylate, tetrahydrofurfuryl (meth)acrylate, and cyclic trimethylolpropane formal (meth)acrylate. One kind of the monofunctional (meth)acrylates each containing the alicyclic structure having the ether bond may be incorporated into the photocurable composition, or a plurality of kinds thereof may be simultaneously incorporated thereinto. To provide a cured product serving as a lost model showing small thermal expansion, and having a higher elastic modulus and heat resistance in a certain temperature region, the monofunctional (meth)acrylate containing the alicyclic structure having the ether bond is preferably tetrahydro-2H-pyran-2-yl acrylate or cyclic trimethylolpropane formal (meth)acrylate.

A content ratio between the monofunctional (meth)acrylate having the alicyclic skeleton for forming the three-dimensional crosslinked structure and the monofunctional (meth)acrylate containing the alicyclic structure having the ether bond in the photocurable composition is not particularly limited as long as the photocurable composition can provide a cured product serving as a lost model showing small thermal expansion, and having a high elastic modulus and heat resistance in a certain temperature region. The term "certain temperature region" as used herein refers to a temperature region (60° C. or less) to which the cured product is exposed in a step before a mold baking step. However, as the content of the monofunctional (meth) acrylate having the alicyclic skeleton for forming the three-dimensional crosslinked structure increases, the heat resistance of the cured product may exceed a temperature region to which the cured product is exposed in the mold baking step. In addition, a reduction in interlayer adhesiveness at the time of the shaping of the cured product by the optical three-dimensional shaping method may occur. Accordingly, the content of the monofunctional (meth)acrylate having the alicyclic skeleton for forming the three-dimensional crosslinked structure is preferably 30 mol % or more and 80 mol % or less of the curable materials. Further, to provide a cured product that shows small thermal expansion, has a higher elastic modulus and heat resistance in a certain temperature region, and is improved in interlayer adhesiveness at the time of its manufacture, the content of the monofunctional (meth)acrylate having the alicyclic skeleton for forming the three-dimensional crosslinked structure is more preferably 40 mol % or more and 50 mol % or less of the curable materials.

The bifunctional (meth)acrylate having a molecular weight of 200 or more and less than 400 is not particularly limited as long as the photocurable composition can provide a cured product serving as a lost model showing small thermal expansion, and having a high elastic modulus and heat resistance in a certain temperature region. As the ratio of a volume occupied by a linear molecular structure in the bifunctional (meth)acrylate having a molecular weight of 200 or more and less than 400 to which a (meth)acryloyl group is bonded in the cured product becomes larger, concern is raised about a reduction in elastic modulus of the cured product and an increase in thermal expansion coefficient thereof. Meanwhile, when no linear molecular structure is present in the photocurable composition, only a (meth)acryloyl group bonded to the alicyclic skeleton of the monofunctional (meth)acrylate is involved in the polymerization reaction of the composition, and hence concern is raised about a reduction in polymerization reactivity due to steric hindrance or the like. Accordingly, the bifunctional (meth)acrylate having a molecular weight of 200 or more and less than 400 is preferably a bifunctional (meth)acrylate having a side chain selected from the group consisting of a linear alkyl chain and a branched alkyl chain each having 1 to 6 carbon atoms, an ethylene glycol chain, and a propylene glycol chain. Specific examples thereof include bifunctional (meth)acrylates, such as diethylene glycol di(meth)acrylate, propylene glycol di(meth)acrylate, cyclohexane-1,4-dimethanol di(meth)acrylate, cyclohexane-1,3-dimethanol di(meth)acrylate, tricyclodecane dimethanol di(meth)acrylate, 2-[5-ethyl-5-[(acryloyloxy)methyl]-1,3-dioxan-2-yl]-2,2-dimethylethyl (meth)acrylate, neopentyl glycol di(meth)acrylate, dicyclopentanyl di(meth)acrylate, an alkylene oxide-modified neopentyl glycol di(meth)acrylate, triethylene glycol di(meth)acrylate, dipropylene glycol di(meth)acrylate, 1,3-adamantane dimethanol di(meth)acrylate, propoxylated neopentyl glycol di(meth)acrylate, ethoxylated bisphenol A di(meth)acrylate, 1,4-butanediol di(meth)acrylate, 1,6-hexanediol di(meth)acrylate, triethylene glycol di(meth)acrylate, 9,9-bis[4-(2-(meth)acryloyloxyethoxy)phenyl]fluorene, 2,2-bis(4-(meth)acryloxyethoxyphenyl)propane, 2,2-bis(4-(meth)acryloxydiethoxyphenyl)propane, 1,1-bis(4-(meth)acryloxyethoxyphenyl)methane, 1,1-bis(4-(meth)acryloxydiethoxyphenyl)methane, 1,1-bis(4-(meth)acryloxyethoxyphenyl)sulfone, and 1,1-bis(4-(meth)acryloxydiethoxyphenyl)sulfone. One kind of the bifunctional (meth)acrylates each having a molecular weight of 200 or more and less than 400 may be incorporated into the photocurable composition, or a plurality of kinds thereof may be simultaneously incorporated thereinto.

A photopolymerization initiator, a light absorber, a polymerization inhibitor, a photosensitizer, a light stabilizer, a heat stabilizer, an antioxidant, a release agent, an antifungal agent, or the like may be further incorporated into the photocurable composition of this embodiment as required. In addition, the photocurable composition of this embodiment is characterized in that when the cured product of the photocurable composition is used as a lost model, the composition is free of a photoacid generator for reducing the residual amount of the ash content of the lost model after the model has been burned off.

Examples of the photopolymerization initiator for generating a radical species through light irradiation include, but not limited to, 2,2-dimethoxy-1,2-diphenylethan-1-one, 2,4,6-trimethylbenzoyl-diphenyl-phosphine oxide, 2-benzyl-2-dimethylamino-1-(4-morpholinophenyl)-1-butanone, 1-hydroxycyclohexyl phenyl ketone, 2-hydroxy-2-methyl-1-phenylpropan-1-one, bis(2,4,6-trimethylbenzoyl)-phenylphosphine oxide, 4-phenylbenzophenone, 4-phenoxybenzophenone, 4,4'-diphenylbenzophenone, and 4,4'-diphenoxybenzophenone.

The addition amount of the polymerization initiator to be incorporated into the photocurable composition preferably falls within the range of from 0.01 mass % or more to 10.00 mass % or less with respect to the photocurable composition. The polymerization initiators may be used alone or in combination thereof. The amount of the polymerization initiator to be added to the photocurable composition may be appropriately selected in accordance with a light irradiation dose and an additional heating temperature. In addition, the amount may be adjusted in accordance with the target average molecular weight of a polymer to be obtained. Further, a critical exposure value and a penetration depth in the optical three-dimensional shaping method may be adjusted by using the initiator in combination with the light absorber to be described later.

The light absorber may be appropriately selected in accordance with the wavelength of UV light to be used in the optical three-dimensional shaping method. However, in the case of an inorganic substance, such as an inorganic filler, when the cured product of the photocurable composition is used as a lost model, an ash content remains at the time of the burning-off of the lost model. Accordingly, an organic substance is desirably selected. In addition, the photosensitizer and the light stabilizer to be described later may each also be used as the light absorber, and the light absorber is not particularly limited as long as the light absorber can control the permeability of the composition. Examples of the light absorber except the photosensitizer and the light stabilizer include, but not particularly limited to, organic polymer fillers.

Examples of the polymerization inhibitor include, but not limited to, hydroquinone-based polymerization inhibitors, such as hydroquinone, hydroquinone monomethyl ether, hydroquinone monoethyl ether, hydroquinone monopropyl ether, hydroquinone monobutyl ether, hydroquinone monopentyl ether, hydroquinone monohexyl ether, hydroquinone monooctyl ether, and hydroquinone monoheptyl ether, and phenol-based polymerization inhibitors each having a substituent, such as 3-(3,5-di-tert-butyl-4-hydroxyphenyl)propionate, which serve as polymerization retarders at the time of the reaction of the photocurable composition or at the time of the storage thereof.

The addition amount of the polymerization inhibitor to be incorporated into the photocurable composition preferably falls within the range of from 0.01 mass % or more to 1.00 mass % or less with respect to the photocurable composition. In addition, the polymerization inhibitors may be used alone or in combination thereof.

Examples of the photosensitizer include benzophenone, 4,4-diethylaminobenzophenone, 1-hydroxycyclohexyl phenyl ketone, isoamyl p-dimethylaminobenzoate, methyl 4-dimethylaminobenzoate, benzoin, benzoin ethyl ether, benzoin isobutyl ether, benzoin isopropyl ether, 2,2-diethoxyacetophenone, methyl o-benzoylbenzoate, 2-hydroxy-2-methyl-1-phenylpropan-1-one, and an acylphosphine oxide. Examples of the polymerization inhibitor include, but not limited to, those described above as the polymerization retarders at the time of the reaction of the photocurable composition or at the time of the storage thereof. In addition, the polymerization inhibitors may be used alone or in combination thereof. In consideration of small coloring of the composition, specifically, hydroquinone-based polymerization inhibitors are preferably utilized in combination. The addition amount of the photosensitizer preferably falls within the range of from 0.01 mass % or more to 10.00 mass % or less with respect to the photocurable composition.

The light stabilizer is not particularly limited as long as the stabilizer does not largely affect the characteristics of the cured product of the photocurable composition, and examples thereof include: benzotriazole-based compounds, such as 2-(2H-benzotriazol-2-yl)-p-cresol, 2-(2H-benzotriazol-2-yl)-4,6-bis(1-methyl-1-phenylethyl)phenol, 2-[5-chloro(2H)-benzotriazol-2-yl]-4-methyl-6-(tert-butyl)phenol, 2-(2H-benzotriazol-2-yl)-4,6-di-tert-pentylphenol, 2-(2H-benzotriazol-2-yl)-4-(1,1,3,3-tetramethylbutyl)phenol, 2,2'-methylenebis[6-(2H-benzotriazol-2-yl)]-4-(1,1,3,3-tetramethylbutyl)phenol, and 2-(2H-benzotriazol-2-yl)-6-dodecyl-4-methylphenol; cyanoacrylate-based compounds, such as ethyl 2-cyano-3,3-diphenylacrylate and 2-ethylhexyl 2-cyano-3,3-diphenylacrylate; triazine-based compounds; and benzophenone-based compounds, such as octabenzone, 2,2'-4,4'-tetrahydroxybenzophenone, and 2,2'-dihydroxy-4,4'-dimethoxybenzophenone. The light stabilizer may serve as a photosensitizer, and in such cases, the photosensitizer may not be added. In addition, the light stabilizer may serve as a light absorber, and in such cases, its addition amount is desirably adjusted so as to conform to curing characteristics required in the optical three-dimensional shaping method. The addition amount preferably falls within the range of from 0.01 mass % or more to 5.00 mass % or less with respect to the photocurable composition.

In addition, any other polymerizable material polymerizable with the photocurable composition of this embodiment or a nonpolymerizable material may be added to the photocurable composition for adjusting the viscosity of the photocurable composition or imparting a function thereto to the extent that a material for a cured product serving as a lost model showing small thermal expansion, and having a high elastic modulus and heat resistance in a certain temperature region can be provided. The addition amount of the polymerizable material preferably falls within the range of from 0.1 mol % or more to 20.0 mol % or less, though the preferred range varies depending on the photocurable composition to which the material is added. When the addition amount is small, an effect of the addition of the polymerizable material is not obtained, and when the addition amount is large, the mechanical characteristics of the cured product at the time of the curing of the photocurable composition reduce. Accordingly, the addition amount is preferably 0.1 mol % or more and 10.0 mol % or less. The polymerizable material is not particularly limited, and is a monofunctional or bifunctional or more (meth)acrylate compound.

Examples of the monofunctional or bifunctional or more (meth)acrylate compound include, but not limited to, 2-ethylhexyl (meth)acrylate, 2-hydroxyethyl (meth)acrylate, 2-hydroxypropyl (meth)acrylate, lauryl (meth)acrylate, stearyl (meth)acrylate, isooctyl (meth)acrylate, tetrahydrofurfuryl (meth)acrylate, isobornyl (meth)acrylate, benzyl (meth)acrylate, ethylene glycol di(meth)acrylate, propylene glycol di(meth)acrylate, trimethylolpropane tri(meth)acrylate, trimethylolpropane di(meth)acrylate, ditrimethylolpropane tetra(meth)acrylate, pentaerythritol tetra(meth)acrylate, dipentaerythritol tri(meth)acrylate, dipentaerythritol penta(meth)acrylate, dipentaerythritol hexa(meth)acrylate, phenoxyethyl (meth)acrylate, phenoxy polyethylene glycol (meth)acrylate, morpholine (meth)acrylate, phenylglycidyl (meth)acrylate, 2-hydroxypropyl (meth)acrylate, isodecyl (meth)acrylate, isooctyl (meth)acrylate, tridecyl (meth)acrylate, ethoxy diethylene glycol (meth)acrylate, methoxy ditripropylene glycol (meth)acrylate, tricyclodecane (meth)acrylate, isobornyl (meth)acrylate, dicyclopentadieneoxyethyl (meth)acrylate, dicyclopentenyl acrylate, dicyclopentenyloxyethyl acrylate, dicyclopentenyloxy methacrylate, dicyclopentanyl acrylate, dicyclopentanyl methacrylate, 1-adamantyl acrylate, 2-methyl-2-adamantyl acrylate, 2-ethyl-2-adamantyl acrylate, 1-adamantyl methacrylate, cyclohexane-1,4-dimethanol di(meth)acrylate, cyclohexane-1,3-dimethanol di(meth)acrylate, tricyclodecanedimethanol di(meth)acrylate, dioxane glycol diacrylate, neopentyl glycol di(meth)acrylate, dicyclopentanyl di(meth)acrylate, an alkylene oxide-modified 1,6-hexanediol di(meth)acrylate, neopentyl glycol di(meth)diacrylate, an alkylene oxide-modified neopentyl glycol di(meth)diacrylate, neopentyl glycol hydroxypivalate di(meth)acrylate, 1,9-nonanediol di(meth)acrylate, polyethylene glycol di(meth)acrylate, polypropylene glycol di(meth)acrylate, and ethylene oxide-modified bisphenol A-type di(meth)acrylate. A plurality thereof may be used simultaneously.

The nonpolymerizable material is not particularly limited, and is desirably an alcohol form of any one of the (meth)acrylates in the photocurable composition in consideration of, for example, adhesiveness and compatibility at the time of the shaping of the cured product serving as a lost model by the optical three-dimensional shaping method. Specific examples thereof include, but not limited to, diethylene glycol, dipropylene glycol, tricyclodecane dimethanol, 2-ethyl-2-adamantanemethanol, 1-adamantanemethanol, cyclohexane-1,4-dimethanol, cyclohexane-1,3-dimethanol, tricyclodecane dimethylol, 1,6-hexanediol, neopentyl glycol, 1,9-nonanediol, cyclic trimethylolpropane formal, and trimethylolpropane formaldehyde acetals.

A method of preparing the photocurable composition of this embodiment is not particularly limited, and a method including weighing all of its materials and then stirring the materials is simplest. When it is difficult to uniformly mix the materials only through the stirring, the composition may be prepared by stirring the materials under heating or by diluting the materials with a solvent, then stirring the mixture, and then removing the solvent.

Next, a cured product of this embodiment is described.

The cured product of this embodiment is a cured product obtained by polymerizing the polymerizable functional groups of the curable materials in the photocurable composition of this embodiment. The cured product of this embodiment is characterized in that in the curable materials formed of at least the monofunctional (meth)acrylates each having a molecular weight of 150 or more and less than 350, and the bifunctional (meth)acrylate having a molecular weight of 200 or more and less than 400, the content of the monofunctional (meth)acrylates is 80 mol % or more and 90 mol % or less of the curable materials, and the respective polymerizable functional groups in the monofunctional (meth)acrylates, which are formed of the monofunctional (meth)acrylate having the alicyclic skeleton for forming the three-dimensional crosslinked structure and the monofunctional (meth)acrylate containing the alicyclic structure having the ether bond, and the bifunctional (meth)acrylate are polymerized.

A conventionally known optical three-dimensional shaping method and a conventionally known optical three-dimensional shaping apparatus may be used in a method of performing optical three-dimensional shaping through use of the photocurable composition of this embodiment. A preferred method includes repeating the following operation to finally provide a target three-dimensional shaped object: an active energy ray is selectively applied to the photocurable composition so that a cured layer having a desired pattern may be obtained, thereby forming the cured layer.

Examples of the active energy ray (photoenergy) may include UV light, an electron beam, an X-ray, a radiation, and a high-frequency wave. Of those, UV light having a wavelength of from 300 nm to 430 nm is preferably used from an economic viewpoint, and a UV laser (e.g., a semiconductor-excited solid laser, an Ar laser, or a He—Cd laser), a high-pressure mercury lamp, an ultrahigh-pressure mercury lamp, a mercury lamp, a xenon lamp, a halogen lamp, a metal halide lamp, a UV light-emitting diode (LED), a fluorescent lamp, or the like may be used as a light source for the active energy ray.

At the time of the formation of each cured resin layer having a predetermined shape pattern by the application of the active energy ray to a shaping surface formed of the photocurable composition, the cured resin layer may be formed with the active energy ray squeezed in a spot shape, such as laser light, by a point drawing or line drawing system. Alternatively, there may be adopted a shaping system including applying the active energy ray in a plane manner to the shaping surface through a plane-like drawing mask formed by arraying a plurality of micro-optical shutters, such as a liquid crystal shutter and a digital micromirror shutter (DMD), to form the cured resin layer.

Figure 1:
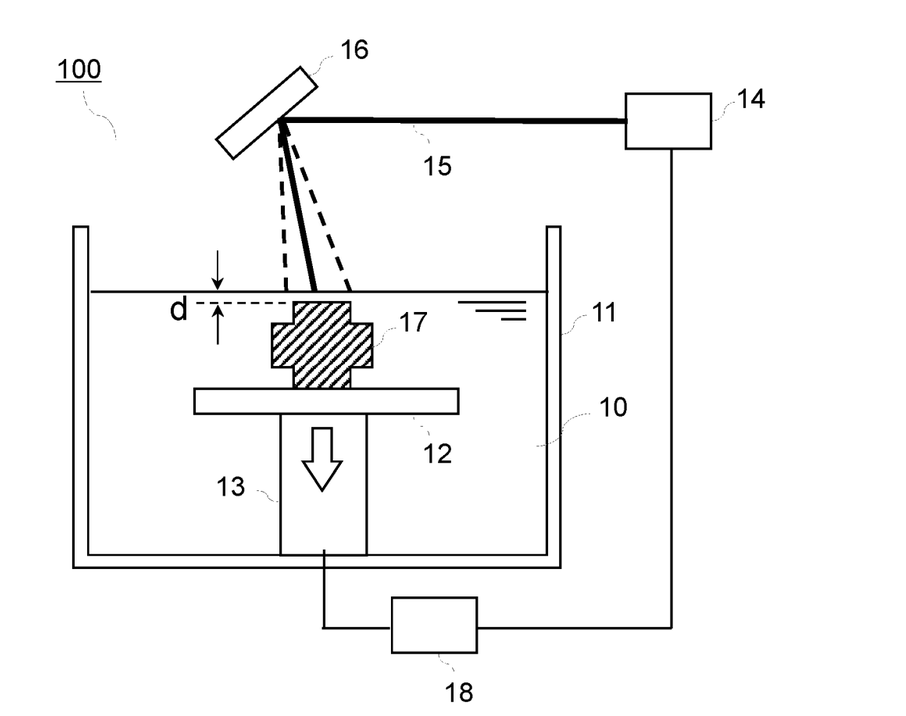
FIG. 1 is a view for illustrating an example of the configuration of a shaping apparatus using a free liquid surface method.

A free liquid surface method serving as a typical example of a preferred optical shaping method is described. An example of the configuration of a shaping apparatus 100 using the free liquid surface method is illustrated in FIGURE. The shaping apparatus 100 includes a tank 11 storing a liquid photocurable resin composition 10. A shaping stage 12 is arranged in the tank 11 so as to be drivable by a driving shaft 13 in a vertical direction. An active energy ray 15 for curing the photocurable resin composition 10 emitted from a light source 14 is applied to the photocurable resin composition 10 in accordance with slice data produced based on three-dimensional shape data on a manufacture target (three-dimensional model). A position to which the active energy ray 15 is applied is changed by a galvano mirror 16 controlled by a control unit 18, and hence the surface of the tank 11 is scanned with the ray. In FIGURE, a scanning range is indicated by thick broken lines.

A depth (thickness) "d" from the surface of the photocurable resin composition 10 to be cured by the active energy ray 15 is a value determined based on a setting at the time of the production of the slice data, and affects the accuracy of an article to be obtained (the reproducibility of the three-dimensional shape data on the article to be shaped). The thickness "d" is achieved when the control unit 18 controls the driving amount of the driving shaft 13.

First, the control unit 18 controls the driving shaft 13 based on the setting, and hence the photocurable resin composition is supplied in the thickness "d" onto the stage 12. The active energy ray 15 is selectively applied to the liquid photocurable resin composition on the stage 12 based on the slice data so that a cured layer having a desired pattern may be obtained. Thus, the cured layer is formed. Next, the stage 12 is moved in a direction indicated by a blank arrow to supply the uncured photocurable resin composition in the thickness "d" to the surface of the cured layer. Then, the active energy ray 15 is applied to the composition based on the slice data, and hence a cured product integrated with the previously formed cured layer is formed. The repetition of the step of curing the composition in a layered manner can provide the target three-dimensional shaped object 17.

As in the free liquid surface method, shaping by a regulated liquid surface method is also preferred. A shaping apparatus using the regulated liquid surface method has a configuration in which the stage 12 of the shaping apparatus 100 of FIG. 1 is arranged so as to lift a shaped object 17 above the liquid surface of the photocurable resin composition, and a light-applying unit is arranged below the tank 11. A typical shaping example of the regulated liquid surface method is as described below. First, the supporting surface of the supporting stage arranged so as to freely elevate and the bottom surface of the tank storing the photocurable resin composition are arranged so as to be separated from each other by a predetermined distance, and the photocurable resin composition is supplied to a space between the supporting surface of the supporting stage and the bottom surface of the tank. Next, light is selectively applied by a laser light source or a projector from the bottom surface side of the tank storing the photocurable resin composition to the photocurable resin composition between the supporting surface of the stage and the bottom surface of the tank in accordance with the slice data. The application of the light cures the photocurable resin composition between the supporting surface of the stage and the bottom surface of the tank to form a solid cured layer. After that, the elevation of the supporting stage peels the cured layer from the bottom surface of the tank.

Subsequently, the height of the supporting stage is adjusted so that the cured layer formed on the supporting stage and the bottom surface of the tank may be separated from each other by a predetermined distance. Then, as in the foregoing, the photocurable resin composition is supplied to a space between the bottom surface of the tank and the cured layer, and the light is applied in accordance with the slice data to form a new cured layer between the cured layer and the bottom surface of the tank. When the step is repeated a plurality of times, a shaped object 17 obtained by integrally laminating the plurality of cured layers can be obtained.

The shaped object 17 thus obtained is removed from the tank 11, and the unreacted photocurable resin composition remaining on its surface is removed. After that, the residue is subjected to postprocessing as required. Thus, the target article can be obtained.

Examples of the postprocessing include washing, post-curing, cutting, polishing, and assembly.

Alcohol-based organic solvents typified by alcohols, such as isopropyl alcohol and ethyl alcohol, may each be used as a washing agent to be used in the washing. In addition, ketone-based organic solvents typified by acetone, ethyl acetate, methyl ethyl ketone, and the like, and aliphatic organic solvents typified by terpenes may each be used.

After the washing, the post-curing based on one or both of photoirradiation and heat irradiation may be performed as required. The post-curing can cure the unreacted photocurable resin composition that may remain on the surface of the shaped object and in the object, and can suppress the surface stickiness of the three-dimensional shaped object. In addition, the post-curing can improve the initial strength of the three-dimensional shaped object.

EXAMPLES

The present disclosure is described in more detail below by way of Examples. The present disclosure is by no means limited to Examples described below without departing from the gist of the present disclosure.

Example 1

10.5 Grams of isobornyl acrylate (manufactured by Tokyo Chemical Industry Co., Ltd.) serving as a monofunctional (meth)acrylate having an alicyclic skeleton for forming a three-dimensional crosslinked structure, 9.5 g of a monofunctional (meth)acrylate containing an alicyclic structure having an ether bond (product name: SARTOMER SR531, manufactured by Arkema S.A.), 4.0 g of a bifunctional (meth)acrylate having a molecular weight of 200 or more and less than 400 (product name: KAYARAD R-604, manufactured by Nippon Kayaku Co., Ltd.), and 0.24 g of a polymerization initiator (product name: Omnirad 184, manufactured by IGM Resins B.V.) were weighed in a brown glass bottle and stirred. An evaluation sample was produced by using the resultant photocurable composition in accordance with the following evaluation sample production method (2a), and was evaluated. The evaluation results are shown in Table 3.

Examples 2 to 9

Photocurable compositions were each obtained in the same manner as in Example 1 except that the monofunctional (meth)acrylate having the alicyclic skeleton, the monofunctional (meth)acrylate containing the alicyclic structure having the ether bond, and the bifunctional (meth)acrylate having a molecular weight of 200 or more and less than 400 were changed to compounds shown in Table 1, and their addition ratios were changed as shown in Table 1. Evaluation samples were produced by using the resultant photocurable compositions in accordance with the following evaluation sample production method (2a), and were evaluated. The evaluation results are shown in Table 3.

Example 10

A photocurable composition was obtained in the same manner as in Example 1 except that: the monofunctional (meth)acrylate having the alicyclic skeleton, the monofunctional (meth)acrylate containing the alicyclic structure having the ether bond, and the bifunctional (meth)acrylate having a molecular weight of 200 or more and less than 400 were changed to compounds shown in Table 1, and their addition ratios were changed as shown in Table 1; and 1.92 g of a polymerization initiator (product name: Omnirad TPO, manufactured by IGM Resins B.V.) and 0.768 g of 2-[5-chloro(2H)-benzotriazol-2-yl]-4-methyl-6-(tert-butyl) phenol (manufactured by Tokyo Chemical Industry Co., Ltd.) serving as a light absorber were used. An evaluation sample was produced by using the resultant photocurable composition in accordance with the following evaluation sample production method (2b), and was evaluated. The evaluation results are shown in Table 3.

Comparative Examples 1 to 13

Photocurable compositions were each obtained in the same manner as in Example 1 except that the monofunctional (meth)acrylate having the alicyclic skeleton, the monofunctional (meth)acrylate containing the alicyclic structure having the ether bond, and the bifunctional (meth) acrylate having a molecular weight of 200 or more and less than 400 were changed to compounds shown in Table 2, and their addition ratios were changed as shown in Table 2. Evaluation samples were produced by using the resultant photocurable compositions in accordance with the following evaluation sample production method (2a), and were evaluated. The evaluation results are shown in Table 4.

(Methods of Producing and Evaluating Evaluation Sample)
(1) Method of Evaluating Evaluation Sample A sample having a size in accordance with JIS standards (4 mm×10 mm×80 mm) was evaluated for its deflection temperature under load with a heat deformation tester (product name: HDT TESTER 3M-2, manufactured by Toyo Seiki Seisakusho Co., Ltd.), and for its bending modulus and bending strength with a material tester (product name: UNIVERSAL MATERIAL TESTER No. 5581, manufactured by Instron Japan Company Limited) under test conditions in accordance therewith, followed by the judgment of the evaluation results by the following criteria.

Deflection Temperature under Load
A: 50° C. or more and less than 60° C.
B: 45° C. or more and less than 50° C.
C: Less than 45° C. or 60° C. or more
Bending Modulus
A: 2.5 GPa or more
B: 2.0 GPa or more and less than 2.5 GPa
C: Less than 2.0 GPa
Bending Strength
A: 90 MPa or more
B: 60 MPa or more and less than 90 MPa
C: Less than 60 MPa In addition, a linear expansion coefficient was measured with a thermal analyzer-cum-thermal measuring apparatus (product name: TMA-Q400, manufactured by TA Instruments). A cube about 5 mm on a side was cut as a sample out of each of the photocurable compositions, and the measurement was performed at a rate of temperature increase of 10° C./min, followed by the calculation of its linear expansion coefficient in the range of from 20° C. to 40° C. The calculated value was judged by the following criteria.

A: Less than 100 ppm
B: 100 ppm or more and less than 130 ppm
C: 130 ppm or more (2a) Method of Producing Evaluation Sample of Cast Shaped Object A mold punched out into a size measuring 4 mm by 10 mm by 80 mm was arranged in quartz plates each having applied thereto a release agent. A photocurable composition was poured into the mold, and the mold was fixed by being sandwiched between the quartz plates each having applied thereto the release agent. The composition was irradiated with UV light from a UV irradiation machine (product name: EX250, manufactured by HOYA Corporation) at 10 mW (evaluated with a 365-nanometer sensor manufactured by Ushio Inc.) for 120 seconds a total of three times: its surface, the surface, and its rear surface. After that, the prism-shaped shaped object was released from the mold to provide an evaluation sample. The resultant evaluation sample was thermally treated at 50° C. for 1 hour, and was further thermally treated at 80° C. for 1 hour to provide an evaluation sample of a cast shaped object.

(2b) Method of Producing Evaluation Sample Based on Optical Three-Dimensional Shaping A prism measuring 4 mm by 10 mm by 80 mm was shaped with DIGITAL WAX 020X manufactured by DWS Systems. The shaped object was obtained at a laser scanning speed of 2,500 mm/sec, a laser scanning interval of 60 μm, and a number of times of bordering of 1. The resultant evaluation sample was washed with 2-propanol, and was then secondarily cured by being irradiated with light having a wavelength of 405 nm through use of FormCure manufactured by Formlabs at 60° C. for 60 minutes. Next, the cured product was thermally treated at 50° C. for 1 hour, and was further thermally treated at 100° C. for 1 hour to provide an evaluation sample.

TABLE 1

| Curable material | | | Example [mol %] | | | | | | | | | | |
|---|---|---|---|---|---|---|---|---|---|---|---|---|---|
| Compound | | Molecular weight | 1 | 2 | 3 | 4 | 5 | 6 | 7 | 8 | 9 | 10 |
| Monofunctional (meth)acrylate having alicyclic skeleton | IBA | 208 | 42 | 43 | 45 | 25 | — | — | — | 35 | 55 | 45 |
| | MADA | 220 | — | — | — | — | — | 43 | 43 | — | — | — |
| | TCDA | 206 | — | — | — | 20 | 48 | — | — | — | — | — |
| | TMHA | 210 | — | — | — | — | — | — | — | — | — | — |
| Monofunctional (meth)acrylate containing alicyclic structure having ether bond | PEGDM | 374 | — | — | — | — | — | — | — | — | — | — |
| | TMPFA | 200 | 43 | 44.5 | 43 | 43 | 34 | 44 | 42 | 50 | 32 | 43 |
| | EEEA | 188 | — | — | — | — | — | — | — | — | — | — |
| Ratio of monofunctional acrylates in curable materials (mol %) | | | 85 | 87.5 | 88 | 88 | 82 | 87 | 85 | 85 | 87 | 88 |
| Bifunctional (meth)acrylate | DEGDM | 242 | 15 | — | — | — | — | — | — | — | — | — |
| | TCDDA | 304 | — | 12.5 | — | — | — | 6 | — | 15 | — | — |
| | DiODA | 326 | — | — | 12 | 12 | — | 7 | — | — | — | 12 |
| | NPGDA | 212 | — | — | — | — | 18 | — | — | — | — | — |
| | NDA | 268 | — | — | — | — | — | — | 15 | — | — | — |
| | TEGDA | 302 | — | — | — | — | — | — | — | — | 13 | — |
| | PEG400DA | 523 | — | — | — | — | — | — | — | — | — | — |
| | BDDA | 198 | — | — | — | — | — | — | — | — | — | — |

TABLE 2

| Curable material | | | | Comparative Example [mol %] | | | | | | | | | | | | |
|---|---|---|---|---|---|---|---|---|---|---|---|---|---|---|---|---|
| Compound | | Molecular weight | Number of carbon atoms of side chain | 1 | 2 | 3 | 4 | 5 | 6 | 7 | 8 | 9 | 10 | 11 | 12 | 13 |
| Monofunctional (meth)acrylate having alicyclic skeleton | IBA | 208 | | 49 | 49 | 85 | 40 | 50 | — | — | 45 | — | — | 45 | 45 | 45 |
| | MADA | 220 | | — | — | — | — | — | — | — | — | — | — | — | — | — |
| | TCDA | 206 | | — | — | — | — | — | — | — | — | — | — | — | — | — |
| | TMHA | 210 | | — | 51 | — | — | — | — | — | — | 44 | — | — | — | — |
| Monofunctional (meth)acrylate containing alicyclic structure having ether bond | PEGDM | 374 | | — | — | — | — | — | — | — | — | — | 45 | — | — | — |
| | TMPFA | 200 | | 51 | — | — | 38 | 42 | 80 | 45 | — | 43 | 43 | 43 | 43 | — |
| | EEEA | 188 | | — | — | — | — | — | — | 40 | 43 | — | — | — | — | 43 |
| Ratio of monofunctional acrylates in curable materials (mol %) | | | | 100 | 100 | 85 | 78 | 92 | 80 | 85 | 88 | 87 | 88 | 88 | 88 | 88 |
| Bifunctional (meth)acrylate | DEGDM | 242 | 4 | — | — | — | 22 | — | — | — | — | — | — | — | — | — |
| | TCDDA | 304 | 1 | — | — | — | — | — | — | 15 | 12 | 13 | — | — | — | — |

TABLE 2-continued

| Curable material | | | Comparative Example [mol %] | | | | | | | | | | | | |
|---|---|---|---|---|---|---|---|---|---|---|---|---|---|---|---|
| Compound | Molecular weight | Number of carbon atoms of side chain | 1 | 2 | 3 | 4 | 5 | 6 | 7 | 8 | 9 | 10 | 11 | 12 | 13 |
| DiODA | 326 | 4 | — | — | — | — | 8 | — | — | — | — | 12 | — | — | — |
| NPGDA | 212 | 5 | — | — | — | — | — | — | — | — | — | — | — | — | — |
| NDA | 268 | 9 | — | — | 15 | — | — | — | — | — | — | — | — | — | — |
| TEGDA | 302 | 8 | — | — | — | — | — | 20 | — | — | — | — | — | — | — |
| PEG400DA | 523 | 18 | — | — | — | — | — | — | — | — | — | — | 12 | — | — |
| BDDA | 198 | 4 | — | — | — | — | — | — | — | — | — | — | — | 12 | 12 |

Compounds represented by the abbreviations in Table 1 and Table 2 are described below. In addition, the symbol "-" in each of Table 1 and Table 2 means that the corresponding compound is not used.

IBA: isobornyl acrylate (manufactured by Tokyo Chemical Industry Co., Ltd., molecular weight: 208)
MADA: adamantantyl acrylate (product name: MADA, manufactured by Osaka Organic Chemical Industry Ltd., molecular weight: 220)
TCDA: dicyclopentanyl acrylate (product name: FA-513AS, manufactured by Hitachi Chemical Co., Ltd., molecular weight: 206)
TMHA: 3,3,5-trimethylcyclohexanol acrylate (product name: SR420NS, manufactured by Arkema S.A., molecular weight: 210)
PEGDM: ethoxylated ethylhexyl polyethylene glycol methacrylate (product name: EH-4E, manufactured by Shin-Nakamura Chemical Co., Ltd., molecular weight: 374)
TMPFA: cyclic trimethylolpropane formal acrylate (product name: SARTOMER SR531, manufactured by Arkema S.A., molecular weight: 200)
EEEA: 2-(2-ethoxyethoxy)ethyl acrylate (manufactured by Tokyo Chemical Industry Co., Ltd., molecular weight: 188)
DEGDM: diethylene glycol dimethacrylate (product name: 2G, manufactured by Shin-Nakamura Chemical Co., Ltd., molecular weight: 242)
TCDDA: tricyclodecanol acrylate (product name: KAYARAD R-684, manufactured by Nippon Kayaku Co., Ltd., molecular weight: 304)
DiODA: 2-[5-ethyl-5-[(acryloyloxy)methyl]-1,3-dioxan-2-yl]-2,2-dimethylethyl acrylate (product name: KAYARAD R-604, manufactured by Nippon Kayaku Co., Ltd., molecular weight: 326)
NPGDA: neopentyl glycol diacrylate (product name: A-NPG, manufactured by Shin-Nakamura Chemical Co., Ltd., molecular weight: 212)
NDA: 1,9-nonanediol diacrylate (product name: A-NOD-N, manufactured by Shin-Nakamura Chemical Co., Ltd., molecular weight: 268)
TEGDA: polyethylene glycol #200 diacrylate (product name: A-200, manufactured by Shin-Nakamura Chemical Co., Ltd., molecular weight: 302)
PEG400DA: polyethylene glycol #400 diacrylate (product name: A-400, manufactured by Shin-Nakamura Chemical Co., Ltd., molecular weight: 523)
BDDA: 1,4-butanediol diacrylate (product name: SR213, manufactured by Arkema S.A., molecular weight: 198)

A case in which the evaluation result in terms of any one of deflection temperature under load, bending modulus, bending strength, and linear expansion coefficient is C is not desired because concern about shape maintenance, mold cracking, or the like grows when the evaluation sample is used as a material for a lost model. A case in which the evaluation result is A or B is preferred.

TABLE 3

| Evaluation content | Example 1 | Example 2 | Example 3 | Example 4 | Example 5 | Example 6 | Example 7 | Example 8 | Example 9 | Example 10 |
|---|---|---|---|---|---|---|---|---|---|---|
| Bending modulus | B | A | A | A | B | A | B | B | A | A |
| Bending strength | B | B | A | B | B | A | B | B | B | A |
| Deflection temperature under load | A | A | A | A | A | A | B | A | B | A |
| Linear expansion coefficient | A | A | A | A | A | A | B | B | A | A |

TABLE 4

| Evaluation content | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Bending modulus | C | B | B | A | A | B | C |
| Bending strength | C | C | B | A | A | B | C |

TABLE 4-continued

| | | | | | | | |
|---|---|---|---|---|---|---|---|
| Deflection temperature under load | C | A | C | C | C | C | C |
| Linear expansion coefficient | C | A | B | A | A | B | C |

| Evaluation content | Comparative Example 8 | Comparative Example 9 | Comparative Example 10 | Comparative Example 11 | Comparative Example 12 | Comparative Example 13 |
|---|---|---|---|---|---|---|
| Bending modulus | C | B | C | C | A | C |
| Bending strength | C | B | C | C | B | C |
| Deflection temperature under load | C | C | C | B | C | C |
| Linear expansion coefficient | B | C | C | B | A | B |

Second Embodiment

A second embodiment of the present disclosure is described in detail below. First, a photocurable composition according to the second embodiment of the present disclosure is described. The photocurable composition according to the second embodiment of the present disclosure is a photocurable composition including curable materials formed of at least monofunctional (meth)acrylates each having a molecular weight of 150 or more and less than 350, and a bifunctional (meth)acrylate having a molecular weight of 200 or more and less than 400, the composition being characterized in that the content of the monofunctional (meth)acrylates is 60 mol % or more and 75 mol % or less of the curable materials, and the monofunctional (meth) acrylates are formed of a monofunctional (meth)acrylate having an alicyclic skeleton and having quaternary carbon, and a monofunctional (meth)acrylate having a branched alkyl chain structure having 15 to 20 carbon atoms.

The photocurable composition of this embodiment is not particularly limited as long as the composition is formed of the monofunctional (meth)acrylates each having a molecular weight of 150 or more and less than 350, and the bifunctional (meth)acrylate having a molecular weight of 200 or more and less than 400. However, the monofunctional (meth)acrylates each preferably have a molecular weight of 150 or more because as the molecular weight becomes smaller, the volatility of the material becomes higher to lead to a change in formulation thereof at the time of its storage. In addition, as the molecular weights of the monofunctional and bifunctional (meth)acrylates become larger, the ratio of a soft moiety, such as an ethylene glycol chain or a propylene glycol chain, increases, and hence the ratio of a main skeleton moiety required for the expression of mechanical properties, such as an alicyclic skeleton, reduces. Thus, the mechanical characteristics of the composition as a material for a lost model reduce. Accordingly, it is preferred that the monofunctional (meth)acrylates each have a molecular weight of less than 350, and the bifunctional (meth)acrylate have a molecular weight of less than 400.

In the photocurable composition of this embodiment, the content of the monofunctional (meth)acrylates is not particularly limited. However, to provide a material formulation for a lost model having a high elastic modulus, showing small thermal expansion, and having heat resistance in a certain temperature region, the content is preferably 50 mol % or more and 95 mol % or less of the curable materials. The content is more preferably 60 mol % or more and 75 mol % or less of the curable materials because a material for a lost model having a higher elastic modulus, showing small thermal expansion, and having heat resistance in a certain temperature region can be provided.

The monofunctional (meth)acrylate having the alicyclic skeleton and having the quaternary carbon is not particularly limited as long as the photocurable composition serves as a material for a lost model having a high elastic modulus, showing small thermal expansion, and having heat resistance in a certain temperature region. Specific examples thereof include monofunctional (meth)acrylates each having an alicyclic skeleton and each having quaternary carbon, such as isobornyl (meth)acrylate, 2-methyl-2-adamantyl (meth)acrylate, 2-ethyl-2-adamantyl (meth)acrylate, trimethylcyclohexane (meth)acrylate, t-butylcyclohexane (meth)acrylate, and cyclic trimethylolpropane formal acrylate. In addition, one kind of the monofunctional (meth) acrylates may be used, or a plurality of kinds thereof may be simultaneously used without any problem as long as a material for a lost model having a high elastic modulus, showing small thermal expansion, and having heat resistance in a certain temperature region is provided.

The monofunctional (meth)acrylate having the branched alkyl chain structure is not particularly limited as long as a material for a lost model having a high elastic modulus, showing small thermal expansion, and having heat resistance in a certain temperature region can be provided. As the length of the alkyl chain of the structure becomes longer, the heat resistance in a certain temperature region becomes lower, and the thermal expansion becomes larger. As the length of the alkyl chain becomes shorter, the heat resistance in a certain temperature region becomes higher. In any case, a material for a lost model having a high elastic modulus, showing small thermal expansion, and having heat resistance in a certain temperature region cannot be provided. In addition, the adoption of not a linear alkyl chain but the branched alkyl chain structure can provide a material for a lost model having a high elastic modulus, showing small thermal expansion, and having heat resistance in a certain temperature region. Accordingly, the number of the carbon atoms of the branched alkyl chain structure is preferably from 10 to 25. In order for the material for a lost model to have a high elastic modulus, to show small thermal expansion, and to have heat resistance in a certain temperature region is provided, the number of the carbon atoms of the branched alkyl chain structure is more preferably from 15 to 20. A specific example of the monofunctional (meth)acrylate having the branched alkyl chain structure is isostearyl (meth)acrylate.

A content ratio between the monofunctional (meth)acrylate having the alicyclic skeleton and having the quaternary carbon, and the monofunctional (meth)acrylate having the branched alkyl chain structure is not particularly limited as long as a material for a lost model having a high elastic modulus, showing small thermal expansion, and having heat resistance in a certain temperature region can be provided. However, as the content of the monofunctional (meth)acrylate having the alicyclic skeleton and having the quaternary carbon increases, the heat resistance in a certain temperature region required in the material for a lost model may exceed the certain temperature region, and a reduction in interlayer adhesiveness at the time of the shaping of the photocurable composition by the optical three-dimensional shaping method may occur. Accordingly, the content of the monofunctional (meth)acrylate having the alicyclic skeleton and having the quaternary carbon is preferably 20 mol % or more and 70 mol % or less of the curable materials. To provide a material that has a higher elastic modulus, shows small thermal expansion, has heat resistance in a certain temperature region, and is improved in interlayer adhesiveness, the content of the monofunctional (meth)acrylate having the alicyclic skeleton and having the quaternary carbon is more preferably 35 mol % or more and 55 mol % or less of the curable materials.

The bifunctional (meth)acrylates each having a molecular weight of 200 or more and less than 400 listed in the first embodiment may each be used as the bifunctional (meth)acrylate having a molecular weight of 200 or more and less than 400.

An additive, such as a photopolymerization initiator, a light absorber, a polymerization inhibitor, a photosensitizer, a light stabilizer, a heat stabilizer, an antioxidant, a release agent, or an antifungal agent, may be further incorporated into the photocurable composition as required. In addition, as in the photocurable composition of the first embodiment, the photocurable composition of this embodiment is characterized in that when a cured product of the photocurable composition is used as a lost model, the composition is free of a photoacid generator for reducing the residual amount of the ash content of the lost model after the model has been burned off. Those described in the first embodiment may be used as the various additives to be incorporated as required.

A method of preparing the photocurable composition of this embodiment is not particularly limited, and a method including weighing all of its materials and then stirring the materials is simplest. When it is difficult to uniformly mix the materials only through the stirring, the composition may be prepared by stirring the materials under heating or by diluting the materials with a solvent and then removing the solvent.

Next, a cured product of this embodiment is described.

The cured product of this embodiment is a cured product obtained by copolymerizing the polymerizable functional groups of the curable materials in the photocurable composition of this embodiment. The cured product of this embodiment is characterized in that in the photocurable composition including the curable materials formed of at least the monofunctional (meth)acrylates each having a molecular weight of 150 or more and less than 350, and the bifunctional (meth)acrylate having a molecular weight of 200 or more and less than 400, the content of the monofunctional (meth)acrylates is 60 mol % or more and 75 mol % or less of the curable materials, and the polymerizable functional groups of the photocurable materials in the photocurable composition in which the monofunctional (meth)acrylates are formed of the monofunctional (meth)acrylate having the alicyclic skeleton and having the quaternary carbon, and the monofunctional (meth)acrylate having the branched alkyl chain structure having 15 to 20 carbon atoms are copolymerized.

The conventionally known optical three-dimensional shaping method and the conventionally known optical three-dimensional shaping apparatus that have been described in the first embodiment may each be used in a method of performing optical three-dimensional shaping through use of the photocurable composition of this embodiment. A preferred method includes repeating the following lamination operation to finally provide a target three-dimensional shaped object: an active energy ray is selectively applied to the photocurable composition so that a cured layer having a desired pattern may be obtained, thereby forming the cured layer; and then, the uncured liquid photocurable resin composition is supplied to the cured layer, and the active energy ray is similarly applied to newly form a cured layer continuous with the cured layer.

The active energy ray suitable for the shaping, a method of applying the active energy ray, a shaping system, and the like are the same as those of the first embodiment.

The present disclosure is described in more detail below by way of Examples. The present disclosure is by no means limited to Examples described below without departing from the gist of the present disclosure.

(Production Procedure and Evaluation Procedure for Evaluation Sample)

(1) Preparation of Photocurable Composition

As described in Examples 11 to 23 and Comparative Examples 14 to 23 below, respective materials whose contents were shown in Table 5 and Table 6 below were sufficiently stirred to prepare photocurable compositions.

(2) Method of Evaluating Evaluation Sample

An evaluation sample was produced in the same manner as in the first embodiment, and was evaluated for its deflection temperature under load, bending modulus, bending strength, and linear expansion coefficient by the same criteria as those of the first embodiment.

(2a) Method of Producing Evaluation Sample of Cast Shaped Object

An evaluation sample of a cast shaped object was also produced in the same manner as in the first embodiment.

(2b) Method of Producing Evaluation Sample Based on Optical Three-Dimensional Shaping An evaluation sample based on optical three-dimensional shaping was also produced in the same manner as in the first embodiment.

Example 11

8.0 Grams of isobornyl acrylate manufactured by Tokyo Chemical Industry Co., Ltd. serving as a monofunctional (meth)acrylate having an alicyclic skeleton and having quaternary carbon, 7.4 g of isostearyl acrylate manufactured by Shin-Nakamura Chemical Co., Ltd. serving as a monofunctional (meth)acrylate having a branched alkyl chain structure, 8.0 g of diethylene glycol dimethacrylate manufactured by Shin-Nakamura Chemical Co., Ltd. serving as a bifunctional (meth)acrylate having a molecular weight of 200 or more and less than 400, and 0.24 g of 1-hydroxycyclohexyl phenyl ketone manufactured by IGM Resins B.V. (product name: Omnirad 184) serving as a polymerization initiator were weighed in a brown glass bottle and stirred. A sample was produced by using the resultant photocurable composition in accordance with the evaluation sample production method (2a), and was evaluated. The evaluation results are shown in Table 5.

Examples 12 to 22

Photocurable materials were weighed by the method described in Example 11 at addition ratios shown in Table 5, and 1.0 wt % of Omnirad 184 serving as a polymerization initiator was weighed with respect to the photocurable materials. The materials were loaded into a brown bottle and stirred. A sample was produced by using the resultant photocurable composition in accordance with the evaluation sample production method (2a), and was evaluated. The evaluation results are shown in Table 5.

Example 23

80.2 Grams of isobornyl acrylate manufactured by Tokyo Chemical Industry Co., Ltd. serving as a monofunctional (meth)acrylate having an alicyclic skeleton and having quaternary carbon, 74.2 g of isostearyl acrylate manufactured by Shin-Nakamura Chemical Co., Ltd. serving as a monofunctional (meth)acrylate having a branched alkyl chain structure, 80.1 g of diethylene glycol dimethacrylate manufactured by Shin-Nakamura Chemical Co., Ltd. serving as a bifunctional (meth)acrylate having a molecular weight of 200 or more and less than 400, 1.92 g of Omnirad TPO manufactured by IGM Resins B.V. serving as a polymerization initiator, and 0.768 g of 2-[5-chloro(2H)-benzotriazol-2-yl]-4-methyl-6-(tert-butyl)phenol manufactured by Tokyo Chemical Industry Co., Ltd. serving as a light absorber were weighed in a brown glass bottle and stirred. A sample was produced by using the resultant photocurable composition in accordance with the evaluation sample production method (2b), and was evaluated. The evaluation results are shown in Table 5.

Comparative Examples 14 to 23

Photocurable materials were weighed by the method described in Example 11 at addition ratios shown in Table 6, and 1.0 wt % of Omnirad 184 serving as a polymerization initiator was weighed with respect to the photocurable materials. The materials were loaded into a brown bottle and stirred. A sample was produced by using each of the resultant photocurable compositions of Comparative Examples 1 to 10 in accordance with the evaluation sample production method (2a), and was evaluated. The evaluation results are shown in Table 6.

TABLE 5

| Material kind | | | | Example [mol %] | | | | | | | | | | | |
|---|---|---|---|---|---|---|---|---|---|---|---|---|---|---|---|
| Functional group | Containing alicyclic skeleton and quaternary carbon | Compound name | Molecular weight | 11 | 12 | 13 | 14 | 15 | 16 | 17 | 18 | 19 | 20 | 21 | 22 | 23 |
| 1 | o | Isobornyl | 208 | 41 | 43 | 46 | — | — | — | — | — | — | 31 | 59 | 47 | 41 |
| | o | 3Me cyclohexane | 210 | — | — | — | 48 | — | — | 49 | — | — | — | — | — | — |
| | o | tBu cyclohexane | 210 | — | — | — | — | 47 | 48 | — | 43 | 48 | — | — | — | — |
| | — | Tricyclodecane | 206 | — | — | — | — | — | — | — | — | — | — | — | — | — |
| | — | Branched C18 | 325 | 24 | 29 | 25 | 21 | 20 | 21 | 21 | 20 | 21 | 32 | 15 | 20 | 24 |
| | — | Branched C8 | 184 | — | — | — | — | — | — | — | — | — | — | — | — | — |
| | — | Branched C10 | 312 | — | — | — | — | — | — | — | — | — | — | — | — | — |
| | — | Linear C18 methacryl | 339 | — | — | — | — | — | — | — | — | — | — | — | — | — |
| | — | Polyethylene glycol | 374 | — | — | — | — | — | — | — | — | — | — | — | — | — |
| Total number of moles of monofunctional acrylate | | | | 65 | 72 | 71 | 69 | 67 | 69 | 70 | 63 | 69 | 63 | 74 | 67 | 65 |
| 2 | | Diethylene glycol metha | 242 | 34 | — | — | — | — | — | — | 37 | — | — | — | — | 35 |
| | | Tricyclodecane acry | 304 | — | 28 | — | 31 | 33 | — | — | — | — | 37 | — | — | — |
| | | Dioxane acry | 326 | — | — | 29 | — | — | 31 | 30 | — | — | — | 26 | — | — |
| | | Neopentyl glycol | 212 | — | — | — | — | — | — | — | — | 31 | — | — | — | — |
| | | Nonane diacry | 268 | — | — | — | — | — | — | — | — | — | — | — | 33 | — |
| | | A-400 | 523 | — | — | — | — | — | — | — | — | — | — | — | — | — |
| | | Butanediol | 198 | — | — | — | — | — | — | — | — | — | — | — | — | — |
| | | Bending modulus | | A | A | A | A | A | B | B | B | B | B | B | B | A |
| | | Bending strength | | A | B | A | B | A | B | B | B | A | B | B | B | A |
| | | Deflection temperature under load | | A | A | A | A | A | A | B | A | A | A | B | B | A |
| | | Linear expansion coefficient | | A | A | A | A | A | B | B | B | A | B | A | B | A |

TABLE 6

| Functional group | Containing alicyclic skeleton and quaternary carbon | Compound name | Molecular weight | Number of carbon atoms of side chain | Comparative Example [mol %] | | | | | | | | | |
|---|---|---|---|---|---|---|---|---|---|---|---|---|---|---|
| | | | | | 14 | 15 | 16 | 17 | 18 | 19 | 20 | 21 | 22 | 23 |
| 1 | o | Isobornyl | 208 | | — | — | — | 34 | — | 46 | 43 | 43 | 30 | 47 |
| | o | 3Me cyclohexane | 210 | | 44 | 49 | — | — | — | — | — | — | — | — |
| | o | tBu cyclohexane | 210 | | — | — | — | — | — | — | — | — | — | — |
| | — | Tricyclodecane | 206 | | — | — | — | — | 48 | — | — | — | — | — |
| | — | Branched C18 | 325 | | — | — | 65 | — | 21 | — | 29 | 29 | 29 | 30 |
| | — | Branched C8 | 184 | | — | — | — | 36 | — | — | — | — | — | — |
| | — | Branched C10 | 312 | | 28 | — | — | — | — | — | — | — | — | — |
| | — | Linear C18 methacryl | 339 | | — | 20 | — | — | — | — | — | — | — | — |
| | — | Polyethylene glycol | 374 | | — | — | — | — | — | 25 | — | — | — | — |
| | | Total number of moles of monofunctional acrylate | | | 72 | 69 | 65 | 70 | 69 | 71 | 72 | 72 | 59 | 77 |
| 2 | | Diethylene glycol metha | 242 | 4 | — | — | 35 | 30 | — | — | — | — | — | — |
| | | Tricyclodecane acry | 304 | 1 | 28 | 31 | — | — | 31 | — | — | — | 41 | 23 |
| | | Dioxane acry | 326 | 4 | — | — | — | — | — | 29 | — | — | — | — |
| | | Neopentyl glycol | 212 | 5 | — | — | — | — | — | — | — | — | — | — |
| | | Nonane diacry | 268 | 9 | — | — | — | — | — | — | — | — | — | — |
| | | A-400 | 523 | 18 | — | — | — | — | — | — | 28 | — | — | — |
| | | Butanediol | 198 | 4 | — | — | — | — | — | — | — | 28 | — | — |
| | | Bending modulus | | | C | C | C | C | B | C | C | A | B | A |
| | | Bending strength | | | C | C | C | C | C | C | C | C | C | C |
| | | Deflection temperature under load | | | C | C | A | B | A | C | C | C | C | B |
| | | Linear expansion coefficient | | | B | C | C | C | A | C | C | A | C | C |

The respective symbols and material names in Table 5 and Table 6 mean the following materials, and the symbol "-" means that the corresponding compound is not used.
Isobornyl: isobornyl acrylate manufactured by Tokyo Chemical Industry Co., Ltd. (molecular weight: 208)
Tricyclodecane: dicyclopentanyl acrylate manufactured by Hitachi Chemical Co., Ltd. (FA-513AS, molecular weight: 206)
3Me cyclohexane: 3,3,5-trimethylcyclohexanol acrylate manufactured by Arkema S.A. (SR420NS, molecular weight: 210)
tBu cyclohexane: 4-tert-butylcyclohexanol acrylate manufactured by Arkema S.A. (SR217NS, molecular weight: 210)
Branched C18: isostearyl acrylate manufactured by Shin-Nakamura Chemical Co., Ltd. (S-1800A, molecular weight: 325)
Branched C8: isooctyl acrylate manufactured by Arkema S.A. (SR440, molecular weight: 184)
Branched C10: isodecyl acrylate manufactured by Arkema S.A. (SR395, molecular weight: 212)
Linear C18 methacryl: isostearyl methacrylate manufactured by Shin-Nakamura Chemical Co., Ltd. (S-1800M, molecular weight: 339)
Polyethylene glycol: ethoxylated ethylhexyl polyethylene glycol methacrylate manufactured by Shin-Nakamura Chemical Co., Ltd. (EH-4E, molecular weight: 374)
Diethylene glycol metha: diethylene glycol dimethacrylate manufactured by Shin-Nakamura Chemical Co., Ltd. (2G, molecular weight: 242)
Tricyclodecane acry: tricyclodecanol acrylate manufactured by Nippon Kayaku Co., Ltd. (KAYARAD R-684, molecular weight: 304)
Dioxane acry: 2-[5-ethyl-5-[(acryloyloxy)methyl]-1,3-dioxan-2-yl]-2,2-dimethylethyl acrylate manufactured by Nippon Kayaku Co., Ltd. (KAYARAD R-604, molecular weight: 326)
Neopentyl glycol: neopentyl glycol diacrylate manufactured by Shin-Nakamura Chemical Co., Ltd. (A-NPG, molecular weight: 212)
Nonane diacry: 1,9-nonanediol diacrylate manufactured by Shin-Nakamura Chemical Co., Ltd. (A-NOD-N, molecular weight: 268)
A-400: polyethylene glycol #400 diacrylate manufactured by Shin-Nakamura Chemical Co., Ltd. (A-400, molecular weight: 523)
Butanediol: 1,4-butanediol diacrylate manufactured by Arkema S.A. (SR213, molecular weight: 198)

As described above, the photocurable composition of the present disclosure can be widely used in an optical three-dimensional shaping field, and its applications are by no means limited. Typical examples of a field in which the cured product of the photocurable composition of the present disclosure is utilized may include: a lost model to be used in a lost-wax casting method; a model for testing an appearance design during designing; a model for checking the functionality of a part; and a base model for manufacturing a mold. In particular, the cured product of the photocurable composition of the present disclosure can be suitably used as a lost model to be used in the lost-wax casting method because the cured product shows small thermal expansion, and has a high elastic modulus and heat resistance in a certain temperature region.

In addition, when a cured product is obtained from the photocurable composition of the present disclosure by a cast shaping method, a shaped object having accuracy that cannot be achieved in the optical three-dimensional shaping field can be provided by using the photocurable composition. A method of shaping the cured product at that time includes: pouring the photocurable composition of the present disclosure into a mold; mounting a transparent substrate having a size matching the mold; and applying an active energy ray to the composition through the transparent substrate. At that time, when the transfer failure of the shape of the mold occurs owing to the curing shrinkage of the photocurable composition, the active energy ray may be applied while the photocurable composition is pressurized. In addition, as in the optical three-dimensional shaping method, a desired shaped object may be obtained by gradually repeating the pouring of the photocurable composition into the mold and its curing.

The photocurable composition and cured product of the present disclosure can each be utilized as a photocurable material for a lost model that has a high elastic modulus, shows small thermal expansion, and has heat resistance in a certain temperature region as compared to a related-art material for optical three-dimensional shaping for a lost model, and is free of a photoacid generator to be used in an epoxy material or the like. Accordingly, the composition and the cured product can each be utilized in the manufacture of a casting having high accuracy and a small number of blowholes in the lost-wax casting method.

According to the present disclosure, there can be provided the photocurable material formulation for a lost model that can be used in the optical three-dimensional shaping method, the formulation showing small thermal expansion, having a high elastic modulus and heat resistance in a certain temperature region, and being free of a photoacid generator. The use of the material formulation of the present disclosure can provide high mechanical characteristics that have not been obtained by a related-art photocurable material formulation for a lost model capable of being used in the optical three-dimensional shaping method, and can provide a low ash content because of the absence of a photoacid generator. Thus, the following step that has heretofore been performed is eliminated: a mold or the like is manufactured, and a lost model is manufactured by injection molding. Accordingly, a casting having high accuracy and a small number of failures, such as blowholes, can be manufactured from a lost model directly manufactured by the optical three-dimensional shaping method in a short time period.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-152638, filed Sep. 11, 2020, Japanese Patent Application No. 2020-153327, filed Sep. 11, 2020, and Japanese Patent Application No. 2021-138345, filed Aug. 26, 2021 which are hereby incorporated by reference herein in their entirety.

What is claimed is:

1. A photocurable composition comprising curable materials formed of monofunctional (meth) acrylates each having a molecular weight of 150 or more and less than 350, and a bifunctional (meth) acrylate having a molecular weight of 200 or more and less than 400,
   wherein the content of the monofunctional (meth) acrylates is 60 mol % or more and 75 mol % or less of the curable materials:
   the monofunctional (meth) acrylates are formed of a monofunctional (meth) acrylate having an alicyclic skeleton and having quaternary carbon, and a monofunctional (meth) acrylate having a branched alkyl chain structure having 15 to 20 carbon atoms,
   the monofunctional (meth) acrylate having the alicyclic skeleton and having the quaternary carbon is selected from the group consisting of isobornyl acrylate, 3,3,5-trimethylcyclohexanol acrylate, and 4-tert-butylcyclohexanol acrylate,
   the monofunctional (meth) acrylate having the branched alkyl chain structure having 15 to 20 carbon atoms is isostearyl acrylate,
   the bifunctional (meth) acrylate having a molecular weight of 200 or more and less than 400 is selected from the group consisting of diethylene glycol dimethacrylate, tricyclodecanol acrylate, 2-[5-ethyl-5-[(acryloyloxy) methyl]-1,3-dioxan-2-yl]-2,2-dimethylethyl acrylate, neopentyl glycol diacrylate, and 1,9-nonanediol diacrylate, and
   a content of the monofunctional (meth)acrylate having an alicyclic skeleton and having quaternary carbon is larger than a content of the monofunctional (meth) acrylate having the branched alkyl chain structure.

2. A cured product comprising a polymer of the photocurable composition of claim 1.

3. The photocurable composition according to claim 1, wherein a content of the monofunctional (meth) acrylate having the alicyclic skeleton and having the quaternary carbon is 35 mol % or more and 55 mol % or less of the curable materials.

4. The photocurable composition according to claim 1, wherein deflection temperature under load of the photocurable composition is 45° C. or more and less than 60° C.

5. The photocurable composition according to claim 1, wherein the content of the monofunctional (meth) acrylates is 60 mol % or more and 75 mol % or less of the curable materials, and the monofunctional (meth) acrylates are formed of the monofunctional (meth) acrylate having the alicyclic skeleton and having the quaternary carbon, and the monofunctional (meth) acrylate having the branched alkyl chain structure having 15 to 20 carbon atoms,
   wherein the monofunctional (meth) acrylate having the alicyclic skeleton and having the quaternary carbon is selected from the group consisting of isobornyl acrylate and 4-tert-butylcyclohexanol acrylate, and
   wherein the bifunctional (meth) acrylate having a molecular weight of 200 or more and less than 400 is selected from the group consisting of diethylene glycol dimethacrylate, tricyclodecanol acrylate, and 2-[5-ethyl-5-[(acryloyloxy) methyl]-1,3-dioxan-2-yl]-2,2-dimethylethyl acrylate.

6. The photocurable composition according to claim 1, wherein a content of the monofunctional (meth) acrylate having the alicyclic skeleton and having the quaternary carbon is 40 mol % or more and 49 mol % or less of the curable materials.

7. A method of manufacturing a cured product comprising polymerizing a photocurable composition,
   wherein the photocurable composition comprising curable materials formed of monofunctional (meth) acrylates each having a molecular weight of 150 or more and less than 350, and a bifunctional (meth) acrylate having a molecular weight of 200 or more and less than 400,
   wherein a content of the monofunctional (meth) acrylates is 80 mol % or more and 90 mol % or less of the curable materials,
   and the monofunctional (meth) acrylates are formed of a monofunctional (meth) acrylate having an alicyclic skeleton for forming a three-dimensional crosslinked structure and a monofunctional (meth) acrylate containing an alicyclic structure having an ether bond,
   wherein the monofunctional (meth) acrylate having an alicyclic skeleton for forming a three-dimensional crosslinked structure is selected from the group consisting of isobornyl acrylate, adamantanyl acrylate, and dicyclopentanyl acrylate, wherein the monofunctional (meth) acrylate containing an alicyclic structure having an ether bond is cyclic trimethylolpropane formal acrylate, and wherein the bifunctional (meth) acrylate having a molecular weight of 200 or more and less than 400 is selected from the group consisting of diethylene glycol dimethacrylate, tricyclodecanol acrylate, 2-[5-ethyl-5-[(acryloyloxy) methyl]-1,3-dioxan-2-yl]-2,2-dimethylethyl acrylate, neopentyl glycol diacrylate, 1,9-nonanediol diacrylate, and polyethylene glycol #200 diacrylate, wherein a content of the monofunctional (meth) acrylate having an alicyclic skeleton for forming a three-dimensional crosslinked structure is 35 mol % or more and 55 mol % or less, and wherein a content of the monofunctional (meth) acrylate containing an alicyclic structure having an ether bond is 32 mol % or more and 50 mol % or less.

8. A method of manufacturing a cured product comprising copolymerizing curable materials in a photocurable composition, wherein the photocurable composition comprising curable materials formed of monofunctional (meth) acrylates each having a molecular weight of 150 or more and less than 350, and a bifunctional (meth) acrylate having a molecular weight of 200 or more and less than 400, wherein a content of the monofunctional (meth) acrylates is 60 mol % or more and 75 mol % or less of the curable materials, and the monofunctional (meth) acrylates are formed of the monofunctional (meth) acrylate having the alicyclic skeleton and having the quaternary carbon, and the monofunctional (meth) acrylate having the branched alkyl chain structure having 15 to 20 carbon atoms, wherein the monofunctional (meth) acrylate having the alicyclic skeleton and having the quaternary carbon is selected from the group consisting of isobornyl acrylate, 3,3,5-trimethylcyclohexanol acrylate, and 4-tert-butylcyclohexanol acrylate, wherein the monofunctional (meth) acrylate having the branched alkyl chain structure having 15 to 20 carbon atoms is isostearyl acrylate, and wherein the bifunctional (meth) acrylate having a molecular weight of 200 or more and less than 400 is selected from the group consisting of diethylene glycol dimethacrylate, tricyclodecanol acrylate, 2-[5-ethyl-5-[(acryloyloxy) methyl]-1,3-dioxan-2-yl]-2,2-dimethylethyl acrylate, neopentyl glycol diacrylate, and 1,9-nonanediol diacrylate, and wherein a content of the monofunctional (meth) acrylate having an alicyclic skeleton and having quaternary carbon is larger than a content of the monofunctional (meth) acrylate having the branched alkyl chain structure.

9. A method of manufacturing an article comprising:

arranging a photocurable resin composition in a predetermined thickness; and applying photoenergy to the photocurable resin composition based on slice data of a three-dimensional model to cure the composition, wherein the photocurable resin composition includes curable materials formed of monofunctional (meth) acrylates each having a molecular weight of 150 or more and less than 350, and a bifunctional (meth) acrylate having a molecular weight of 200 or more and less than 400, and wherein in a case that a content of the monofunctional (meth) acrylates is 80 mol % or more and 90 mol % or less of the curable materials:

the monofunctional (meth) acrylates are formed of a monofunctional (meth) acrylate having an alicyclic skeleton for forming a three-dimensional crosslinked structure and a monofunctional (meth) acrylate containing an alicyclic structure having an ether bond, the monofunctional (meth) acrylate having an alicyclic skeleton for forming a three-dimensional crosslinked structure is selected from the group consisting of isobornyl acrylate, adamantanyl acrylate, and dicyclopentanyl acrylate, the monofunctional (meth) acrylate containing an alicyclic structure having an ether bond is cyclic trimethylolpropane formal acrylate, the bifunctional (meth) acrylate having a molecular weight of 200 or more and less than 400 is selected from the group consisting of diethylene glycol dimethacrylate, tricyclodecanol acrylate, 2-[5-ethyl-5-[(acryloyloxy) methyl]-1,3-dioxan-2-yl]-2,2-dimethylethyl acrylate, neopentyl glycol diacrylate, 1,9-nonanediol diacrylate, and polyethylene glycol #200 diacrylate, a content of the monofunctional (meth) acrylate having an alicyclic skeleton for forming a three-dimensional crosslinked structure is 35 mol % or more and 55 mol % or less, and a content of the monofunctional (meth) acrylate containing an alicyclic structure having an ether bond is 32 mol % or more and 50 mol % or less; or wherein in a case that the content of the monofunctional (meth) acrylates is 60 mol % or more and 75 mol % or less of the curable materials:

the monofunctional (meth) acrylates are formed of a monofunctional (meth) acrylate having an alicyclic skeleton and having quaternary carbon, and a monofunctional (meth) acrylate having a branched alkyl chain structure having 15 to 20 carbon atoms, the monofunctional (meth) acrylate having the alicyclic skeleton and having the quaternary carbon is selected from the group consisting of isobornyl acrylate, 3,3,5-trimethylcyclohexanol acrylate, and 4-tert-butylcyclohexanol acrylate, the monofunctional (meth) acrylate having the branched alkyl chain structure having 15 to 20 carbon atoms is isostearyl acrylate, the bifunctional (meth) acrylate having a molecular weight of 200 or more and less than 400 is selected from the group consisting of diethylene glycol dimethacrylate, tricyclodecanol acrylate, 2-[5-ethyl-5-[(acryloyloxy) methyl]-1, 3-dioxan-2-yl]-2,2-dimethylethyl acrylate, neopentyl glycol diacrylate, and 1,9-nonanediol diacrylate, and a content of the monofunctional (meth) acrylate having an alicyclic skeleton and having quaternary carbon is larger than a content of the monofunctional (meth) acrylate having the branched alkyl chain structure.

10. The method of manufacturing an article according to claim 9, further comprising washing and/or post-curing a shaped object obtained by repeating the arranging the photocurable resin composition in the predetermined thickness and the applying the photoenergy to the photocurable resin composition to cure the composition a plurality of times.

11. A photocurable composition comprising curable materials formed of monofunctional (meth) acrylates each having a molecular weight of 150 or more and less than 350, and a bifunctional (meth) acrylate having a molecular weight of 200 or more and less than 400,
- wherein a content of the monofunctional (meth) acrylates is 80 mol % or more and 90 mol % or less of the curable materials,
- the monofunctional (meth) acrylates are formed of a monofunctional (meth) acrylate having an alicyclic skeleton for forming a three-dimensional crosslinked structure and a monofunctional (meth) acrylate containing an alicyclic structure having an ether bond,
- the monofunctional (meth) acrylate having an alicyclic skeleton for forming a three-dimensional crosslinked structure is selected from the group consisting of isobornyl acrylate, adamantanyl acrylate, and dicyclopentanyl acrylate,
- the monofunctional (meth) acrylate containing an alicyclic structure having an ether bond is cyclic trimethylolpropane formal acrylate,
- the bifunctional (meth) acrylate having a molecular weight of 200 or more and less than 400 is selected from the group consisting of diethylene glycol dimethacrylate, tricyclodecanol acrylate, 2-[5-ethyl-5-[(acryloyloxy) methyl]-1,3-dioxan-2-yl]-2,2-dimethylethyl acrylate, neopentyl glycol diacrylate, 1,9-nonanediol diacrylate, and polyethylene glycol #200 diacrylate,
- a content of the monofunctional (meth) acrylate having an alicyclic skeleton for forming a three-dimensional crosslinked structure is 35 mol % or more and 55 mol % or less, and
- a content of the monofunctional (meth) acrylate containing an alicyclic structure having an ether bond is 32 mol % or more and 50 mol % or less.

12. The photocurable composition according to claim 11, wherein a content of the monofunctional (meth) acrylate having the alicyclic skeleton for forming the three-dimensional crosslinked structure is 40 mol % or more and 50 mol % or less of the curable materials.

13. The photocurable composition according to claim 11, wherein the alicyclic skeleton for forming the three-dimensional crosslinked structure is at least one member selected from the group consisting of an adamantane skeleton, a norbornane skeleton, and a dicyclopentadiene skeleton.

14. The photocurable composition according to claim 11,
- wherein the monofunctional (meth) acrylate having an alicyclic skeleton for forming a three-dimensional crosslinked structure is selected from the group consisting of isobornyl acrylate and adamantanyl acrylate, and
- wherein the bifunctional (meth) acrylate having a molecular weight of 200 or more and less than 400 is selected from the group consisting of tricyclodecanol acrylate and 2-[5-ethyl-5-[(acryloyloxy) methyl]-1,3-dioxan-2-yl]-2,2-dimethylethyl acrylate.

* * * * *